(No Model.)

W. S. JOHNSON.
TEMPERATURE REGULATING SYSTEM.

No. 379,201.  Patented Mar. 6, 1888.

Fig. 1

Attest.
Sidney P. Hollingsworth
N. R. Kennedy.

Inventor
W. S. Johnson
By Phil T. Dodge
atty.

(No Model.) 5 Sheets—Sheet 3.

W. S. JOHNSON.
TEMPERATURE REGULATING SYSTEM.

No. 379,201. Patented Mar. 6, 1888.

Fig. 8. ON LINE 2-2

Fig. 9. ON LINE 3-3

Fig. 10. ON LINE 3-3

Attest:
A. A. Kennedy,
F. T. Chapman.

Inventor.
W. S. Johnson,
By his Atty
Phil. T. Dodge.

N. PETERS, Photo-Lithographer, Washington, D. C.

(No Model.) 5 Sheets—Sheet 4.

W. S. JOHNSON.
TEMPERATURE REGULATING SYSTEM.

No. 379,201. Patented Mar. 6, 1888.

Attest
W. A. Kennedy,
F. S. Chapman

Inventor:
W. S. Johnson.
By his Atty
Phil. T. Dodge.

(No Model.) 5 Sheets—Sheet 5.

W. S. JOHNSON.
TEMPERATURE REGULATING SYSTEM.

No. 379,201. Patented Mar. 6, 1888.

Attest:
Sidney P. Hollingsworth
N. R. Kennedy.

Inventor:
W. S. Johnson.
By his Atty.
P. T. Dodge.

UNITED STATES PATENT OFFICE.

WARREN S. JOHNSON, OF MILWAUKEE, WISCONSIN.

TEMPERATURE-REGULATING SYSTEM.

SPECIFICATION forming part of Letters Patent No. 379,201, dated March 6, 1888.

Application filed April 26, 1887. Serial No. 236,196. (No model.)

*To all whom it may concern:*

Be it known that I, WARREN S. JOHNSON, of Milwaukee, in the county of Milwaukee and State of Wisconsin, have invented certain Improvements in the Systems for the Automatic Regulation of Temperature in Buildings and Elsewhere, of which the following is a specification.

My invention relates to the automatic supply and regulation of heat to apartments by a system of apparatus in which electricity controls a fluid under pressure and the fluid under pressure operates the controlling-valves of the heating apparatus.

Many patents have beeen granted to me for devices working in connection with electricity and fluid-pressure, the first as the direct and the second as the indirect power for the operation of the valves.

My present invention comprehends a more complete system of regulation than has heretofore been shown, one which is entirely automatic and which requires no attention for long periods of time. To this end I avail myself of sources of power which are constant and which are supplied without the attention of the occupants of the apartments of which the temperature is to be regulated.

In order to render my system automatic I employ water supplied from a city main or other source, from which it is delivered constantly and under pressure as a power for compressing air, and apply the air thus compressed under the control of automatic electric devices to operate the valves on the heating appliances.

A building fitted with my system, so that each apartment will have its temperature automatically regulated from a central source of power, is supplied with four systems of conductors which operate together to accomplish the final result. First, a system of heat-conductors; second, a system of conductors containing air under pressure; third, a conductor of water under pressure; fourth, a series of electrical conductors or distributers. These four systems of distributers bear the following relation to each other: first, the heat-conductors distribute the heat from a central source to the various apartments; second, the conductors of air or other gaseous pressure apply the same to control the action of the heating apparatus; third, the water-conductors apply the fluid-pressure to effect the compression of the air; fourth, the electric conductors distribute and apply the electrical energy to operate at stated times valves for governing the compressed air and controlling its action on the valves which regulate the heating apparatus.

In my apparatus, as will hereinafter more fully appear, the heating system is the only one of the four conducting or distributing systems which is normally in action. The other systems—viz., the liquid-pressure, the air-pressure, and the electrical energy—are normally in a state of potential and become active or kinetic only at intervals and for short periods of time. By this arrangement I am enabled to control valves on the heating system, which require much power to operate them with a small expenditure of electrical energy and a small loss of fluid under pressure.

To more clearly demonstrate the various parts of my system their mutual action, and the results secured, reference must be had to the accompanying drawings, in which—

Referring to the drawings, A is a source of heat-supply, represented in the present instance as a steam-boiler, from which the steam is delivered through distributing-pipes $a$ to radiators $b$, located in the several apartments or otherwise distributed throughout the building. The admission of steam to each radiator is controlled by an adjacent valve, B, hereinafter explained in detail, which is provided with an expansion-chamber and adapted to be operated by air or other gaseous fluid under pressure. This gaseous fluid is distributed to the various steam-controlling valves B through a pipe, C, from a reservoir or other source of supply, D. The air is compressed into this reservoir by a pump or compressor, E, which is in turn actuated by the pressure of water or other liquid, received in the present instance through a pipe, F, supposed to connect with the city main or other source from which a constant supply of water under pressure may be obtained. It will be observed that the water acts to compress the air, and that the air acts in turn to operate the valves and control the admission of heat to the apartments.

The action of the air on each steam-controlling valve B is in turn controlled by an electric or electro-pneumatic valve G, which is applied to the air-pipe C. The valves G are controlled through suitable conductors by electric energy derived from a battery or other generator, H. The action of the electric currents on the respective air-valves G is controlled by thermostats I, located in the various apartments or otherwise suitably distributed throughout the building. As the temperature rises and falls, the thermostats cause the valves G to deliver the air to and from the steam-valves to effect the opening and closing of the latter according as the temperature may demand the admission or the stoppage of the heat.

Under the above arrangement the liquid-pressure in the main is converted into a gaseous fluid-pressure, which is in turn applied to control the admission of heat to the respective apartments, subject, however, to the control of the thermostatic devices. In this manner the thermostatic devices, requiring but a slight expenditure of electric energy, are enabled to bring into action at the proper times the fluid-pressure by which the steam-controlling valves are positively operated to regulate the delivery into the apartments of the heat by which the thermostats are themselves actuated. Thus it will be seen that the heat reacts upon itself through the intermediate powers of electricity and fluid-pressure to control itself and maintain a practically unvarying temperature.

My principal object in using an intermediate air-compressor between the liquid supply and the mechanism it is to control, lies in the fact that water, owing to its great weight, is of widely different pressures at different heights, while the air, on the contrary, by reason of its light specific gravity, may be carried to any required height without any appreciable change in pressure. Modern buildings are frequently of great height, and should it be attempted to use the water-pressure to directly operate the steam-controlling valves in the different stories it would be necessary to operate the water at very high and objectionable pressures, for otherwise it would be found that a pressure ample in the lower stories for the purposes in view would be accompanied by a pressure in the upper stories insufficient to accomplish the desired end. As the valves to be operated require the same power without reference to their altitude, the direct employment of water would frequently give a surplus of power in one part of the building and an insufficient power in another. These difficulties are entirely overcome by the intervention of the hydraulic air-compressor between the primary source of power (the water) and the reservoir D. The employment of air is also advantageous in that it may be freely discharged after performing its duty without providing receiving or returning pipes to dispose of it.

The compressor E may be of any form adapted to be actuated by water, and to effect the compression of air or other gaseous fluid, provided it is adapted to start automatically when the air-pressure falls below the proper limit, and to stop automatically when the limit is reached. It being the aim of my invention to produce an apparatus which is strictly automatic, and which will without attention remain in operative condition from year to year, the air-compressing pump must be of such character that it will stop and start automatically, as above mentioned. As ordinary hydropneumatic pumps are not well adapted for this use, although certain of them may be used, I recommend the employment of the pump represented in Figs. 20 and 21, which I devised for use in my system. This pump is constructed as follows: On a suitable base-plate are mounted two metal chambers, $a^4$ and $a^5$, each divided vertically by a flexible diaphragm into an outer water-space and an inner air-space. The two diaphragms $b^4$ and $b^5$ are connected by a rod. $c^4$, passing through stuffing-boxes at the sides of the chambers. The pipe F, constantly supplying water under pressure, has two branches, $d^4$ and $d^5$, leading into the respective chambers at the outer sides of the diaphragms. At the junction of the branch pipes with the main pipe they are connected by a four-way valve, $e^4$, with a waste-pipe, $f^4$, shown in Fig. 21. This valve is provided with two arms or tappets, $g^4$, and is connected to one end of a spiral spring, $h^4$, which, passing the center as the valve is turned to and fro, serves to hold it first in one position and then in the other. A pendulous weight, $i^4$, attached to the frame in such position that it will swing against and move the valve-arms or tappets, has above its fulcrum a lip adapted to encounter a collar, $j^4$, on the rod $c^4$, by which the weight is raised and permitted to fall as the diaphragms move to and fro. An air-delivery pipe, $k^4$, has branches leading to the inner sides or air-spaces of the respective chambers $a^4$ and $a^5$. Air-inlet pipes $l^4$ and $l^5$ lead from the respective air-spaces of the chambers and present their inner ends or mouths near the tappets $g^4$ of the valve $e^4$, the tappets being provided with faces $m^4$ and $m^5$, adapted to act against and close the ends of the pipes $l^4$ and $l^5$ alternately.

Figure 20:
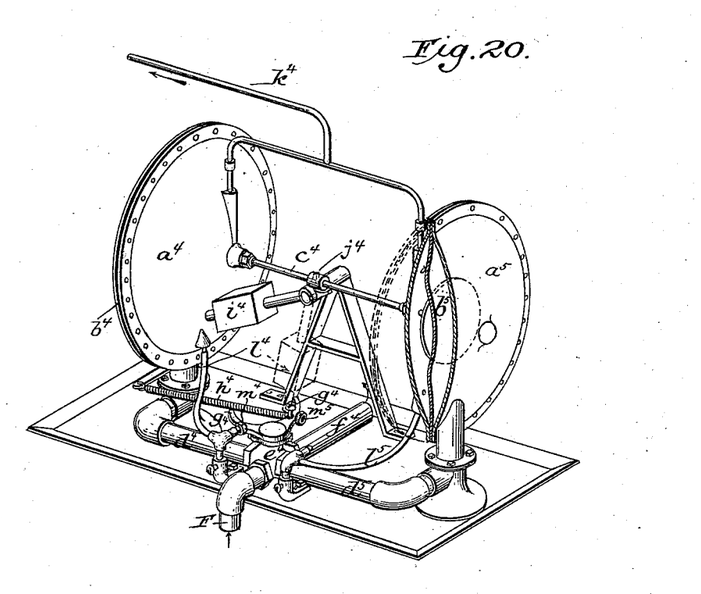
Fig. 20 is a perspective view of the hydropneumatic pump which I commonly employ, a portion being broken away to expose the internal construction to view.
Figure 21:
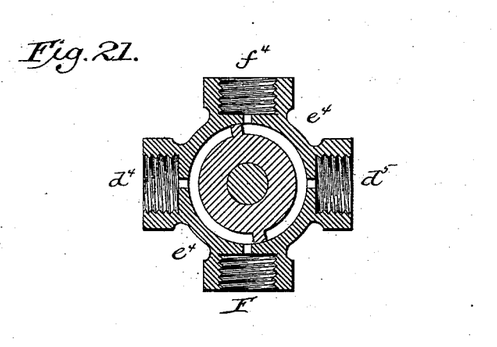
Fig. 21 is a cross-section through the main valve of said pump.

The operation is as follows: When the parts are in the position shown in Figs. 20 and 21, the actuating water passes through the valve $e^4$ into the outer side of chamber $a^4$, forcing the diaphragm to the right and expelling the air at the opposite side of the diaphragm through pipe $k^4$. At this time the pipe $l^4$ is closed and pipe $l^5$ open. The diaphragm of chamber $a^4$ forces the rod $c^4$, and thereby the diaphragm $b^5$, to the right, causing the waste water to escape from said chamber through pipe $d^5$ and valve $e^4$, and at the same time causing the chamber to fill with air on the opposite side of the diaphragm through the pipe $l^5$. During these actions the weight, which hangs normally in the intermediate position shown by dotted lines, is raised, as shown in Fig. 20, until finally, as the diaphragms complete their movement to the right, the collar releases the weight, which in falling acts upon and reverses the position of the valve $e^4$, whereupon the water is delivered into the right-hand chamber and out of the left-hand chamber, and air delivered from the right-hand and into the left-hand chamber. As soon as the collar $j^4$ has passed the upper end of the weight-arm in either direction, the weight falls past the perpendicular and acts upon one or the other of the valve-arms, but finally assumes the pendent position shown by dotted lines, so that it will again be raised in the opposite direction by the returning collar. In other words, the diaphragms moving to the right swing the weight to the left, and vice versa. The advantages of this form of pump lie in the facts that it is exceedingly simple, that it will stop whenever the resistance or counter-pressure of the air reaches the required limit, and that it will start promptly and with certainty from any position in which it may have stopped as soon as the air-pressure falls below the limit. Its action is wholly automatic, being controlled by the changing relations of the water-pressure on the one side to the air-pressure on the other.

I do not claim as part of the present invention the details of the pump herein described.

I prefer to employ water at a pressure of about ten pounds to the square inch, and to have the pump adapted to compress the air to a like pressure. When the proper pressure of the air is attained, the pump or compressor stops in consequence of the resistance. Both pressures remain in potential and the pump at rest until the balance is destroyed by a loss of air-pressure from its use, when the pump will automatically start and continue its action until the air-pressure is again raised to the proper limit.

Figures 2, 3:
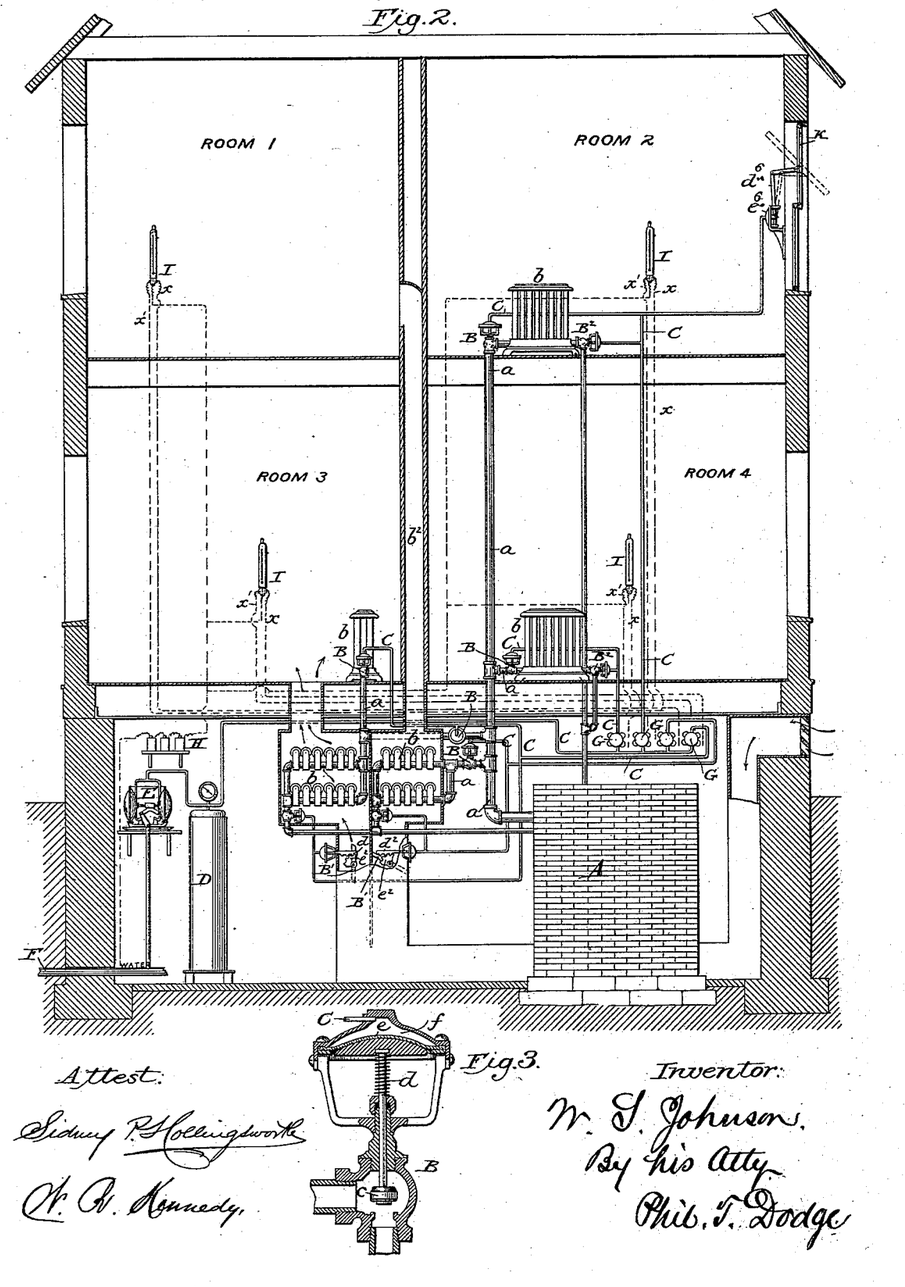
Fig. 2 is a sectional elevation showing several apartments in a building with my system of apparatus applied thereto, the parts being shown more in detail than in the preceding figure.
Fig. 3 is a central section of one of the valves used in the heating-pipes to control the steam or other means of heat-distribution by fluid-pressure.
Figure 4:
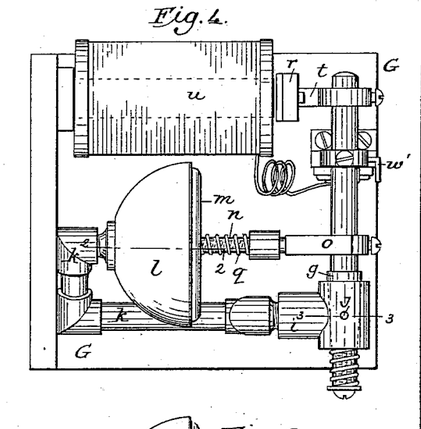
Fig. 4 is a plan view of the electro-pneumatic secondary valves, which I prefer to employ in my system for controlling the action of the air or other fluid under pressure on the valves which regulate the heaters.

Each of the steam-controlling valves B is constructed as shown in Fig. 3. The valve proper, $c$, of the puppet type, has its spindle projected externally and encircled by a spring, $d$, which tends to open the valve and admit steam to the radiator. The spindle or plate on its upper end rests beneath a flexible diaphragm, $e$, forming the movable wall of a chamber, $f$, into which the air is delivered at the proper time from the pipe C. When thus admitted, the air expands the chamber, and, forcing the diaphragm downward, closes the valve, so that further admission of steam to the radiator is prevented.

The valves G, through which the air is delivered to actuate the steam-valves, are each of the type known as "three-way waste-valves"—that is to say, of such construction that when adjusted in one position they permit the air to pass forward from the source of supply into the pipe beyond, but when turned to another position they prevent the further advance of fluid and permit that which had already passed to retreat and flow to waste. When, therefore, either valve G is opened, it causes the compressed air to close the steam-valve, but when the valve G is closed it permits the air to escape from the expansion-chamber of the steam-valve, which is thereby permitted to open.

In Figs. 4 to 10 I have represented the preferred form of air-controlling valve. The rotary plug or valve proper, $g$, has a port extended transversely therethrough in an angular direction. The body is provided with the inlet and outlet ports $h$ and $i$ and with the waste-port $j$. When the plug stands as in Fig. 9, air is delivered to the steam-valve; but when it is turned as in Fig. 10 the flow of air is stopped and the waste port opened to allow the discharge of the air retreating from the steam-valve. The pipe $k$ leads from the delivery side of the valve into an expansion-chamber, $l$, having its movable wall $m$, of rubber or like material, arranged to act against a rod, $n$, having at its opposite end a rack, $o$, which engages a pinion, $p$, on the valve-plug, so that air admitted through the valve acts in part to expand the chamber and cause the rack to turn the plug, so as to prevent the further admission of air. Thus the advancing air is caused to close the valve through which it was delivered. When the valve is thus closed, its waste-port is opened and the air permitted to escape from the expansion-chamber $l$, leaving the valve in condition to be again opened by the action of a spring, $q$, which encircles the rack-bar. As, however, it is required to hold the valve in its open or its closed position, and thus keep the steam-valve in an open or a closed position, as the case may be, until the temperature in the apartment is raised or lowered, I provide a lock to hold the air-valve as soon as it is either opened or closed until it is released by the thermostat. This lock consists of an armature, $r$, drawn forward by a spring, $s$, and arranged to engage on one side or the other with a projection, $t$, on the valve-plug. The armature stands in the field of an electromagnet, $u$, the coils of which connect at one end with any of the metal pipes leading to the ground, or to a special ground-wire, and at the opposite end connect with a vibrating switch, $v$, which is carried to and fro, as the valve opens and closes, by the arms $w$ and $w'$ thereon. This switch makes contact alternately with the terminal plates of two conducting-wires, $x$ and $x'$, which extend to opposite sides of the appropriate thermostat I, the two wires and the switch forming what is technically known as an "electric cross."

Figure 1:
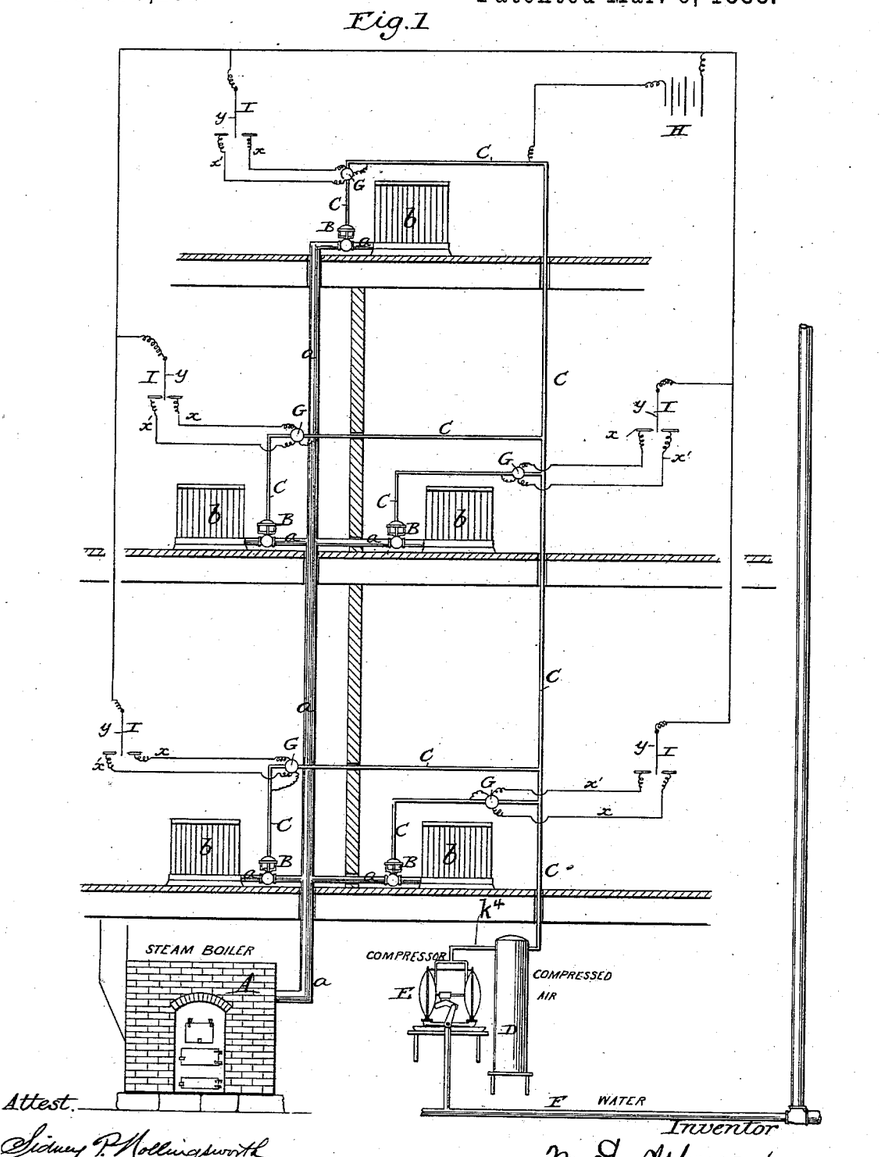
Figure 1 is a view, in the nature of a diagram, illustrating the general arrangement of the various parts of the system and their relations to each other.
Figure 5:
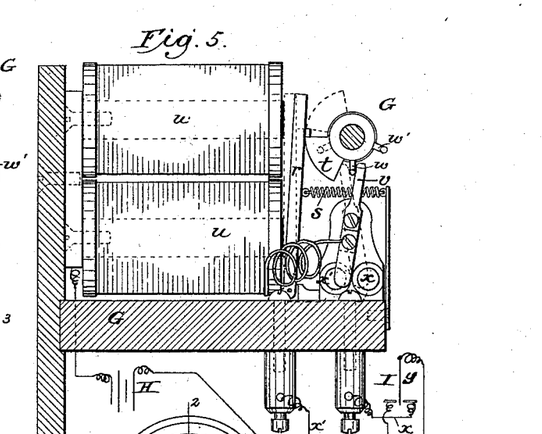
Fig. 5 is a side elevation of the same, partly in section.
Figures 6, 7, 8, 9, 10:
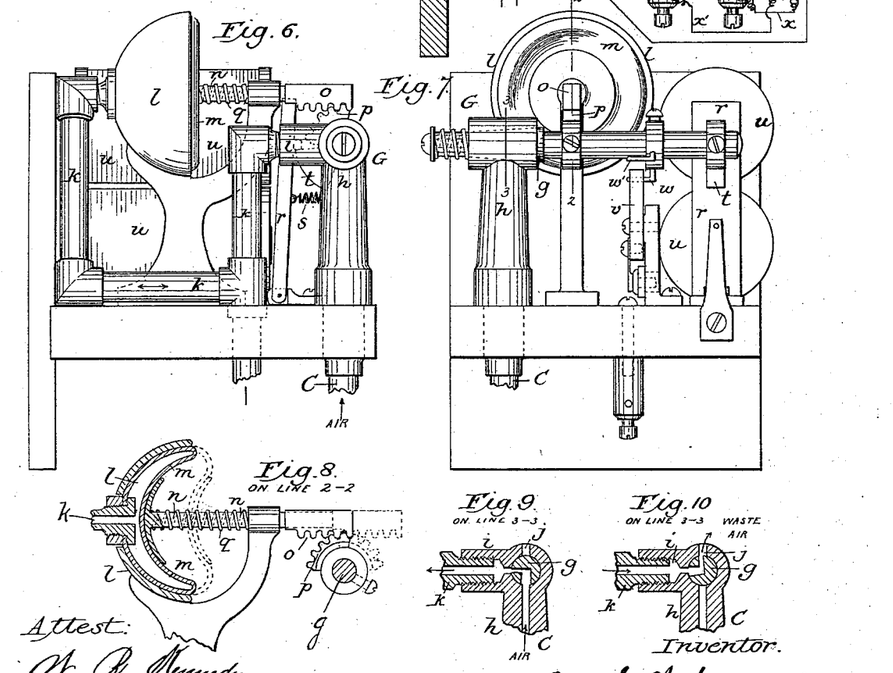
Fig. 6 is a side elevation of the entire valve mechanism.
Fig. 7 is an end elevation of the same.
Fig. 8 is a sectional view on the line 2 2.
Figs. 9 and 10 are sections on the line 3 3, showing the valve proper in different positions.

The thermostat, which is of familiar form, consists of a bar, $y$, composed of two metallic plates, which expand and contract unequally under like changes of temperature, so that the bar is thereby caused to bend to the right or left. At one end this bar is fixed and united to the battery-wire, and at the other end is arranged to vibrate between the terminals of the wires $x$ and $x'$, as shown in Figs. 1 and 5, to make contact with the one or the other, according as the temperature runs above or below the fixed limit. When the thermostatic bar makes contact on either side, it completes the circuit through one or the other of the wires $x$ and $x'$ and the switch to the magnet and thence to the ground. The magnet, being thus excited, attracts the armature and unlocks the valve, which at once turns from the closed to the open or from the open to the closed position. In this moving the valve turns the switch, breaking the circuit just used and allowing the armature to lock the valve in its new position, and at the same time placing the switch in connection with the other wire leading to the thermostat, so that when the changing temperature closes the thermostat on the opposite side it will complete the newly-formed circuit through the magnet and again unlock the valve. Thus it will be seen the changes in temperature are rendered instrumental in applying the electric current to effect the opening and closing of the valve, and the valve caused to open and leave open the circuit after the current has acted momentarily to perform its office.

The operation of the above-described system is as follows: The boiler A being in action, the air-valves G closed, the steam-valves B open, and the receiver D filled with compressed air, steam flows from the boiler through the pipes $a$ to all the radiators. When the temperature in any room rises to the predetermined limit, the thermostat closes the circuit through $x$ to the air-valve G, which, being open, permits the air to flow through pipe C to the steam-valve B, closing the latter and stopping the supply of steam to the radiator. In thus acting the valve G breaks the circuit $x$ and leaves it open. The parts remain in this condition until the falling temperature in the room causes the thermostat to close circuit $x'$. Thereupon the air-valve G closes, allowing the air in the expansion-chamber of valve B to escape, whereupon the valve B opens and again admits steam to the radiator. This action is accompanied by the breaking of circuit $x'$ and the restoration of the switch to such position that the thermostat may next complete the circuit $x$. The waste of air is exceedingly small, and is compensated for from time to time by the action of the compressor E. The reservoir D could be dispensed with and the compressor arranged to deliver directly into the air-distributing pipes; but its use is advisable on account of the speedy and uniform action secured and for other reasons.

In Fig. 2 I have represented a system composed of the same members and having essentially the same mode of action as that shown in Fig. 1, but differing therefrom in the arrangement of the heat-distributing apparatus, and consequently in the location of the controlling devices. The water-supply, air-compressor, air-distribution, air-controlling valves, and thermostatic circuits are essentially the same as in Fig. 1.

Apartment No. 1 is heated by indirect radiation, the air ascending thereto through a flue, $b^2$, from the radiator $b$ in the basement. Air is admitted to this radiator, and thence to the apartment, by the valve B', having an expansion-chamber through which the air acts to close the valve in essentially the same manner as in the steam-controlling valves. This air-valve is of the butterfly type, and provided with a pinion, $e^2$, actuated by a rack-bar, $d^2$, attached to the movable wall of the expansion-chamber. The opening of the air-valve G by the thermostat effects the closing of the valve B'. As an additional means of controlling the heat in apartment No. 1, its radiator $b$ is provided with the steam-controlling valve B, connected and actuated in precisely the same manner as the steam-controlling valve in Fig. 1.

Apartment No. 2 is heated by a radiator having a steam-admission valve, B, operated by air and controlled through a thermostat, I, and air-valve G in the same manner as the valves connected with the radiators in Fig. 1. This radiator is, however, provided with an additional valve, $B^2$, to close its steam-delivery side. This valve is constructed in the same manner as the inlet-valve B, and connected with the same air-delivery pipe, so that it is controlled thermostatically and operated at the same time and in the same manner as the valve B. This apartment is further provided, as a means of regulating its temperature, with a pivoted ventilating valve or window, K, connected by a lever, $d^6$, to the movable wall of an expansion-chamber, $e^6$, connected with and receiving air from the pipe C, which connects with the steam-controlling valves, so that when the air is admitted to close the steam-valves it will expand the chamber $e^6$ and open the ventilator, permitting the egress of heated air and the ingress of cool air.

Apartment No. 3 is heated in part indirectly by a radiator controlled in precisely the same manner as the radiator for heating apartment No. 1, and in part by direct radiation, the radiator $b$ located therein being provided with steam-controlling valves, constructed, connected, and controlled in the same manner as the valves in Fig. 1.

Apartment No. 4 is heated solely by direct radiation, the steam-radiator therein being provided with inlet and outlet valves identical with those in apartment No. 2.

It will be observed that in the system represented in Fig. 2 the method of thermostatically controlling the temperature through the action of water compressing air and air thermostatically controlled and applied to actuate the heat-regulating valves is essentially the same as in the system described in Fig. 1, the difference residing simply in the form and arrangement of the heating apparatus.

While I have described that form of air-controlling valve which I prefer to employ, it is to be understood that other air-controlling valves controlled by electricity may be substituted therefor, and that such valves may be operated either by the pressure of the air, as in the first example, by a spring, or by other suitable motors. In Figs. 11 to 19 I have represented modified forms of this valve, which are well adapted for general use.

In the operation of each valve there are two things to be done: first, the valve proper is to be moved in one direction or the other, and, second, the electric circuit is to be broken. Now, while the electricity is the initial cause which controls said valve, it may or may not be the power which directly operates the valve or breaks the circuit, for either or both of these operations may be performed by the fluid-pressure, subject to electric control.

First. The secondary three-way valve may be entirely electro-magnetic—that is, the valve may be turned and the current broken by the magnetic force alone without the aid of any other force; and in this class I may employ either of two forms—viz., one in which there are two or more electro-magnets which operate alternately to open and close the valve and break the circuit, and the other in which an electro-magnet or magnets proper operate a polarized armature, as in Figs. 11 and 13. In the latter case, while the current traverses alternately the two conductors it also traverses the coils of the same magnet or magnets, but in reverse directions, dependent upon which branch of the circuit is for the time being in use.

Second. The three-way valve may be directly moved by the fluid-pressure, the electricity serving only to release a detent allowing such movement, and the current may be broken by the magnetic action.

Third. The three-way valve may be directly moved and the circuit directly broken by fluid-pressure, the electricity serving only to allow the fluid-pressure to turn the valve and break the circuit, as in the valve heretofore described and illustrated in Figs. 4 to 10.

Fourth. The three-way valve may be directly operated magnetically, but the current broken by fluid-pressure.

Figure 12:
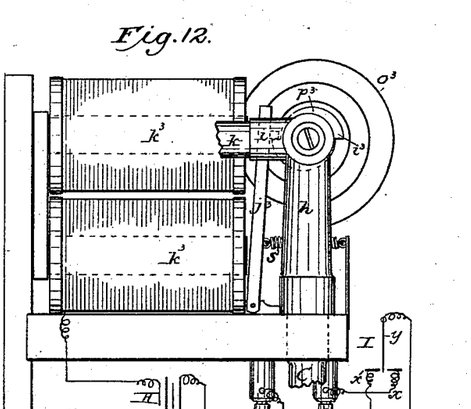

Fifth. The three-way valve may be operated and the current broken by some independent power to operate the valve and the circuit-breaking devices, as illustrated in Figs. 12 and 14.

Such of these various forms of secondary or three-way valves as are not fully described in previous patents or applications are described herein. It is to be understood that they are treated simply as equivalents of each other in the combinations in which they are herein shown, and I deem it unnecessary to specifically describe herein those forms which are not novel and which are not specifically claimed herein.

Figure 11:
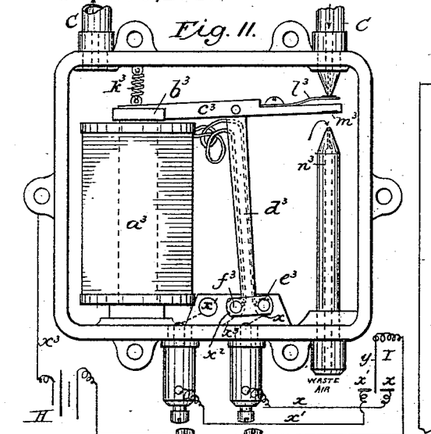
Figs. 11 to 19 are views showing various modifications of the valve.

In Fig. 11, $a^3$ is an electro-magnet; $b^3$, a polarized armature arranged in front of the magnet and carried by a lever, $c^3$, having an arm, $d^3$, which carries at its ends the contact-buttons $e^3$ and $f^3$, to which the terminals of the magnet coil or coils are attached. Immediately under the contact-buttons are the two insulated buttons $x$ and $x'$ of the conductors, (indicated by the same letters,) which conductors are extended to opposite side of the thermostat in precisely the same manner as the conductors of the valves heretofore described. Between the conductors $x$ and $x'$ is the third conductor $x^2$, forming the terminal of the battery-wire $x^3$. The spring $k^3$ tends to draw the armature away from the magnet. The parts are all incased in a body which serves as an air-receiving chamber. The air entering through the pipe C at one side escapes through the continuation of the pipe at the opposite side, as indicated by the arrows. One end of the armature is provided with a spring-arm, $l^3$, to close the inlet-port, and also provided on the opposite side with a face, $m^3$, to close the outlet or waste port $n^3$. As shown in Fig. 11, the armature is in contact with the electro-magnet, being held by its own attraction against the action of the spring $k^3$. This keeps the supply-port closed and the contact-buttons $e^3$ and $f^3$ in contact with the buttons $x$ and $x^3$. If by a rise in temperature the thermostatic bar is thrown in contact with the conductor $x$, the electric circuit is completed through the magnet in such direction that its polarity becomes the same as that of the armature. The effect is to release the armature and permit it to be moved by the spring, so as to open the inlet-port and close the waste-port, whereupon the air under pressure will pass through the valve to the main or steam-controlling valve. As the armature moves, the lever $d^3$ shifts the buttons $f^3$ and $e^3$, breaking the circuit just employed and establishing connection with the battery-wire and the conductor $x'$, as plainly shown in Fig. 16; but when the thermostat is moved in the opposite direction by a diminishing temperature it makes contact at $x$, closing the circuit and directing the current through the magnet in the opposite direction from that in which it was previously directed, thus changing the polarity of the magnet so that it attracts the armature and closes the inlet-port, at the same time opening the waste-port. In thus shifting, the armature returns the contact-buttons to their first position, breaking the circuit. The magnetic attraction of the armature, however, holds it in its position, notwithstanding the fact that the magnet is discharged.

Figures 13, 14, 15, 16, 17, 18, 19:
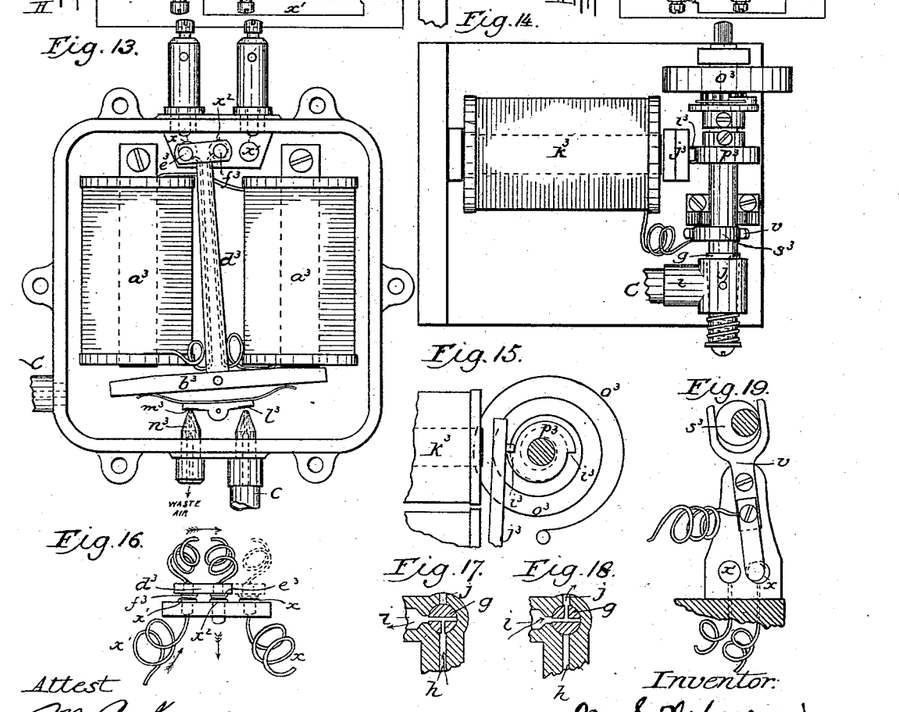

In Fig. 13 a valve like that in Fig. 11 has a polarized armature and a like device for breaking and reversing circuits; but, unlike that shown in Fig. 11, it has two independent electro-magnets with their respective coils arranged in the same circuit and of like polarity. The armature being polarized, one end will be attracted by one of the magnets and the other end repelled by the other, the attraction and repulsion depending upon the direction in which the current is passed through the line. The circuit-breaking devices and their connections are practically identical with those shown in Fig. 11. The inlet and outlet ports are closed alternately by the valve-plates $l^3$ $m^3$ on the armature.

Figs. 12 and 19 show the details of a valve in which a spring is used as the motive power. This valve, like that shown in Figs. 4 to 10, has a rotary valve-plug, its spindle carrying a pawl-and-ratchet mechanism connected with a coiled spring, $o^3$, after the manner of the ordinary winding mechanism of a clock, so that when wound the spring tends to revolve the valve. A hub, $p^3$, on the spindle is provided on opposite sides with stop-shoulders $i^3$, which engage alternately with a shoulder or armature, $j^3$, in the field of an electro-magnet, $k^3$, so that when the armature is momentarily attracted by the magnet it permits the valve to make a half-revolution and turn from its open to its closed position or from its closed to its open position. An eccentric, $s^3$, on the spindle operates a vibratory switch, constructed and arranged to control thermostatic circuits in a manner identical with that shown in Fig. 5.

It is to be particularly noted in connection with my present system that it is wholly automatic in its action, and that the water delivered under pressure from a source of constant supply maintains the required air-pressure at all times and in all portions of the valve-operating system.

In Letters Patent of the United States, No. 352,874, issued to me on the 16th day of November, 1886, is shown a thermostatically-controlled valve, through which air is admitted to control the steam-valve, the air being delivered from a receiver, into which it is compressed by a hand-pump. This system differs from the present, among other particulars, in that there is no automatic air-compressor; in that it is necessary for the attendant to keep constant watch of the air-receiver and to recharge the same by hand from time to time, and also in that there is no provision for maintaining a uniform or constant pressure in the air-receiver.

In Letters Patent of the United States, No. 331,406, granted to me on the 1st day of December, 1885, is shown a thermostatically-controlled valve through which air is delivered from a receiver into expansion-chambers for controlling the main steam-valve.

Neither of the foregoing patents represent a system arranged to control the temperature in a series of apartments deriving their heat from a common source.

I do not claim herein the details of the valves and their connections shown in Figs. 12, 14, 15, 17, 18, and 19, as they are embodied in a prior application, Serial No. 234,214, filed April 9, 1887.

I do not claim, broadly, the compression of air by means of a hydraulic motor, my invention in this regard consisting in the combination, with an electro-pneumatic heat-controlling system such as herein described, of a constant water-supply and an air-compressing device actuated by the water when said device is located between the water-supply and the air-distributing system, and so constructed and arranged that it will stop and start automatically, being controlled in its action by the rise and fall of the air-pressure on the one side in relation to the water-pressure on the other.

Having thus described my invention, what I claim is—

1. In a system for the automatic regulation of heat, the combination, substantially as described and shown, of the following elements: a series of pipes supplying heat to a series of apartments, valves directly controlling the delivery of heat through said pipes, fluid-pressure devices to operate said valves, the series of secondary electrically-controlled valves controlling the delivery of air to said fluid-pressure devices, an automatically-acting hydraulic pump to effect the compression of said air, and a source of liquid-pressure supply, as a city water main, having constant communication with said pump, whereby the water is caused to maintain a constant and uniform air-pressure throughout the system, and the secondary valves caused, subject to thermostatic control, to apply the air-pressure for the operation of the main or heat-controlling valves.

2. In an automatic system for heat-regulation, the combination of a source of constant liquid pressure supply, as a city water-main, an automatic air-compressor connected constantly therewith and actuated by the liquid, a heat-distributing system, valves operated by the compressed air to control the heat-delivery at different points, the secondary electric valves controlling the action of the air on the main valves, and thermostats connected with and controlling the secondary valves.

3. In a system of heat distribution and regulation, the combination of the following instrumentalities: first, a heating apparatus connected with and delivering heat to a series of apartments, and valves controlling the heat-delivery to the respective apartments, each valve provided with an expansion-chamber through which it may be actuated by air-pressure; second, a system of electric distribution embracing a series of thermostats, secondary valves controlled by the thermostats, and in turn controlling the delivery of air to the expansion-chambers of the heat-controlling valves; third, a system of air-distribution through the electric valves to the expansion-chambers; fourth, a means of constant water-supply under pressure, as a city water main; fifth, a hydraulically-actuated air compressing pump located between the air-distributers and the water-supply in constant communication therewith, and adapted to stop and start automatically as the air-pressure rises and falls in relation to the water-pressure.

4. In a system of heat distribution and regulation, the combination of a heater which delivers air to a series of apartments, a series of main valves controlling the heat-delivery to the respective apartments, expansion-chambers connected one to each of said valves, conductors for delivering air under pressure to said expansion-chambers, and an electric system controlling the air-delivery to the expansion-chambers, said system comprising a generator, main conductors, cross-conductors arranged a pair in each apartment, each pair of cross-conductors having at one end a thermostat to connect them one at a time with the main line, and having at the other end a secondary electrically-actuated supply and waste valve directly controlling the compressed air-delivery to one of the expansion-chambers, whereby the series of apartments heated from a common source are individually controlled as to their temperature.

5. In combination with a series of main valves in a system of heating-pipes, said valves adapted to be operated by fluid-pressure, conductors through which fluid under pressure is delivered to actuate said main valves, electric secondary valves on the last-named conductors to control the fluid which actuates the main valves, and an electric-controlling system for said secondary valves, comprising a generator, main conductors, a series of pairs of cross conductors located between the main conductors and connected with the secondary valves, and thermostatic circuit-controlling devices which close the circuits through the two cross-conductors alternately.

6. In a system of electric control for a series of main valves, and in combination with main valves having each an expansion-chamber to receive an actuating-fluid, conductors to deliver air or other fluid under pressure to said expansion-chambers, secondary valves on said conductor to control the delivery of fluid to and from the expansion-chambers, and an electric-controlling system for said secondary valves, comprising an electric generator and main conductors, cross-conductors each having two branches, said branches having at one end a thermostatic switch which connects with the branches alternately, and at the other end a second switch which automatically moves from the branch closed by the thermostat to the other, as described, whereby the main valves are automatically opened and closed, and during the electric circuits opened and left open with the exception of momentary periods of closure.

7. In a system of heat supply and control, the combination of a heating apparatus connecting with a series of apartments, an initial fluid-supply, an air-pump actuated thereby, air-distributers leading from the air-pump to a series of expansion-chambers, a series of valves connected to said expansion-chambers and controlling the delivery of heat to the respective apartments, electric valves applied to the air-distributing pipes, and thermostats located in the several apartments and arranged to control the corresponding electric valves, the whole constituting an automatic system under which an initial actuating-fluid is applied to cause a second fluid to actuate the heat-controlling valves.

8. The combination, substantially as described, of a main valve, B, provided with an expansion-chamber to receive an actuating-fluid, a secondary valve controlling said fluid and itself actuated by the fluid which it controls, an electrically-actuated detent which governs the movement of the secondary valve, a circuit-breaking device, also actuated by the fluid-pressure, and a suitable circuit closing device, whereby the electric action is rendered momentary only, but caused to control the secondary valve, so that it will in turn through the fluid medium control the main valve.

9. In an electrically-controlled supply and waste valve, the combination of the valve proper, an expansion-chamber which operates the valve by means of the fluid which has passed through the valve, an electrically-actuated detent controlling the movement of the valve, the electric circuit including a circuit-breaking device, also actuated by the pressure of the fluid which has passed the valve in harmony with the movement of the valve, and a suitable circuit-closing device to secure the disengagement of the detent.

10. The combination of a valve proper, an expansion-chamber for operating said valve by fluid pressure, an electrically-actuated detent controlling the action of the valve, and a detent-controlling circuit containing a circuit-breaking device actuated by the fluid-pressure, and a thermostatic circuit-closing device.

In testimony whereof I hereunto set my hand, this 4th day of April, 1887, in the presence of two attesting witnesses.

WARREN S. JOHNSON.

Witnesses:
ROBERT R. HOSKING,
ELLA E. MOODY.